United States Patent [19]

Tamura

[11] 4,369,461

[45] Jan. 18, 1983

[54] METHOD AND APPARATUS FOR FORMING IMAGES

[75] Inventor: Yasuyuki Tamura, Kawasaki, Japan

[73] Assignee: Canon Kabushiki Kaisha, Tokyo, Japan

[21] Appl. No.: 201,536

[22] Filed: Oct. 28, 1980

[30] Foreign Application Priority Data

Nov. 2, 1979 [JP] Japan ................................ 54-142386

[51] Int. Cl.³ .............................................. H04N 1/46
[52] U.S. Cl. ................................................... 358/75
[58] Field of Search ................................... 358/75, 12

[56] References Cited

U.S. PATENT DOCUMENTS 3,942,154  3/1976  Akami ................................... 358/75

Primary Examiner—Richard Murray
Attorney, Agent, or Firm—Fitzpatrick, Cella, Harper & Scinto

[57] ABSTRACT

Method and apparatus for forming images are characterized in that an original document is read while discriminating between the presence and absence of colored portion, the read signal relating to the portion where color is detected is replaced by a predetermined pattern generator signal to form an image forming signal whereas the read signal relating to the portion where color is not detected is used as an image forming signal as it is and an image of the original is formed in accordance with these image forming signals.

9 Claims, 7 Drawing Figures

FIG. 5B
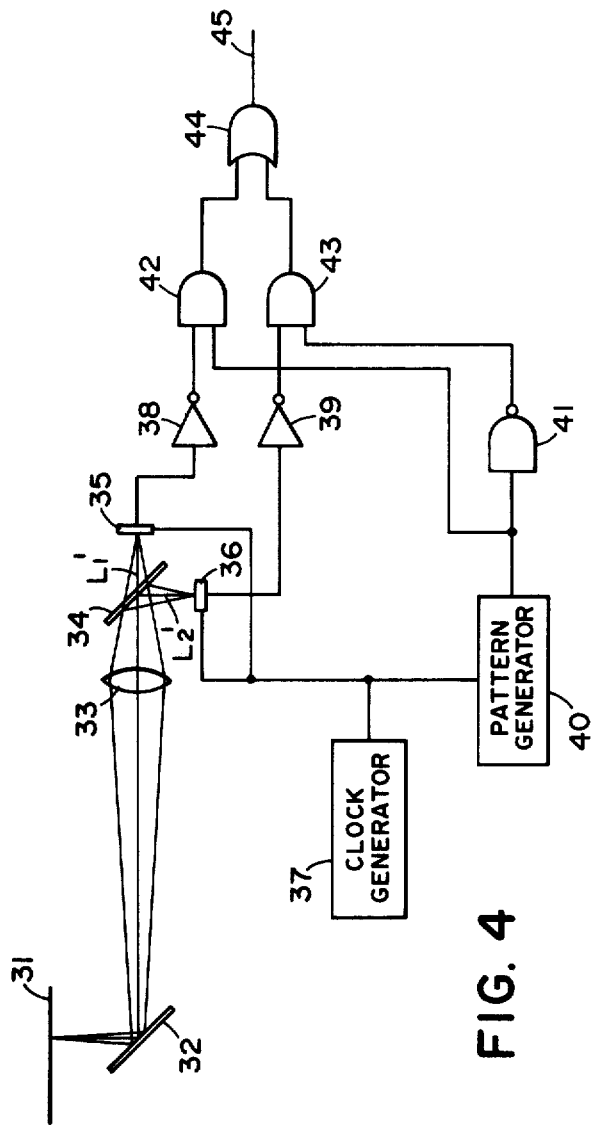
FIG. 5A
FIG. 4

METHOD AND APPARATUS FOR FORMING IMAGES

BACKGROUND OF THE INVENTION

1. Field of the Invention

The present invention relates to method and apparatus for forming images and more particularly to an image forming method and apparatus of the type in which an original image is provisionally transformed into a time series electric signal by photo-electric transformation and then the electric signal is transferred or processed to form a picture signal with which an image of the original is formed by employing a known technique such as laser beam modulation or CRT control.

2. Description of the Prior Art

In a known image forming process involving a data transfer or transmission step such as facsimile, an original is read using a photo-electric transducer such as solid image sensor to photo-electrically convert the original image into a time series electric signal. The electric signal thus provisionally formed is transferred to the station at which a final image of the original is formed using the electric signal. In this process it is a common practice of the prior art to detect only the difference in density of the original but not the difference in color thereof.

However, there are sometimes such cases where the original document contains a differently colored figure or graph. In this case, it is impossible to distinguish one color from another by photo-electrically transformed signals as mentioned above. These signals contain only information of density level for all of the colors present in the original document. Since colors present in an original are generally of high density, two different colors in an original document are rendered in nearly equal density signals so that is is impossible to distinguish one from another in the reproduced original image. In general, the black portion of an original can be reproduced completely and faithfully in the reproduced image. However, the grey portion of the original and the differently colored figures or graphs contained in the same original are represented equally in grey in the reproduced image. Therefore, it is very difficult to distinguish one color from another on the reproduction.

SUMMARY OF THE INVENTION

Accordingly, it is an object of the invention to provide novel method and apparatus for forming images.

It is a more specific object of the invention to provide such image forming method and apparatus which permits a monochromatic reproduction to be obtained from a multi-color original in which man can distinguish one color from another present on the original even when these colors in the original are equal in density to each other.

To attain the objects according to the invention, it is proposed to read an original while discriminating the presence and absence of a colored portion in the original. Among the signals obtained by the reading, the color detected portion is replaced by a predetermined pattern generator signal to form an image forming signal. As for the non-color detected portion, the read signal forms directly an image forming signal. In accordance with these image forming signals an image of the original is finally formed.

Other and further objects, features and advantages of the invention will appear more fully from the following description of preferred embodiments with reference to the accompanying drawings.

BRIEF DESCRIPTION OF THE DRAWINGS

FIG. 4 schematically shows another embodiment of image forming apparatus for carrying out the method of the invention;

FIG. 5A shows an example of pattern produced by a pattern generator according to the invention; and FIG. 5B shows an inverted pattern thereof.

DESCRIPTION OF PREFERRED EMBODIMENTS

Figure 1:
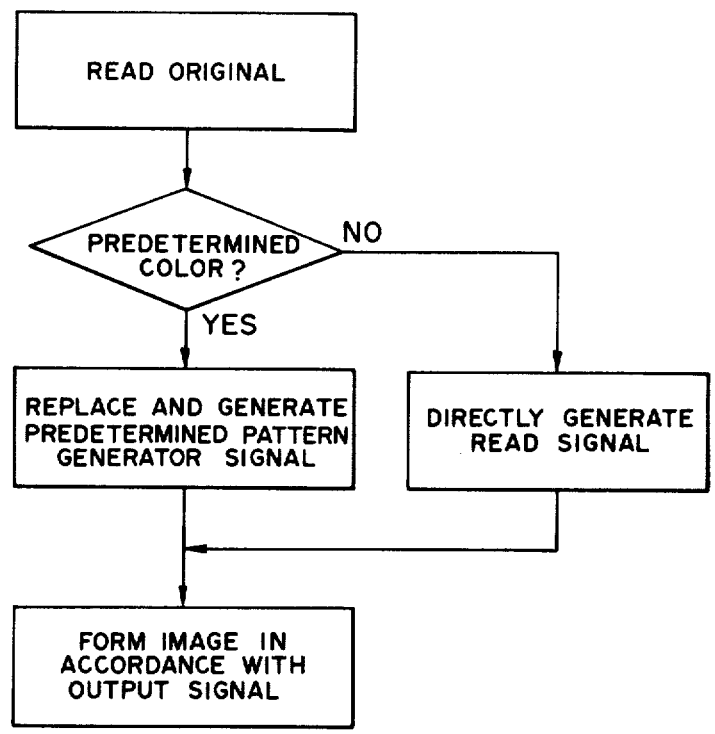
FIG. 1 is a flow diagram illustrating the method of the invention.

The principle of the present invention is illustrated by the flow chart shown in FIG. 1.

An original is read by a solid image sensor such as a CCD. This reading of the original is carried out while making a discrimination regarding colors in the original. As to the portion of the original having a predetermined color, the read signal derived from the portion is replaced by a predetermined pattern generator signal and the pattern generator signal is put out as an image forming signal of the portion. On the other hand, as to the portion of the original which is not of the predetermined color, the read signal derived from the portion is put out directly as an image forming signal of the portion. Finally, an image of the original is formed in accordance with these image forming output signals.

Figure 2:
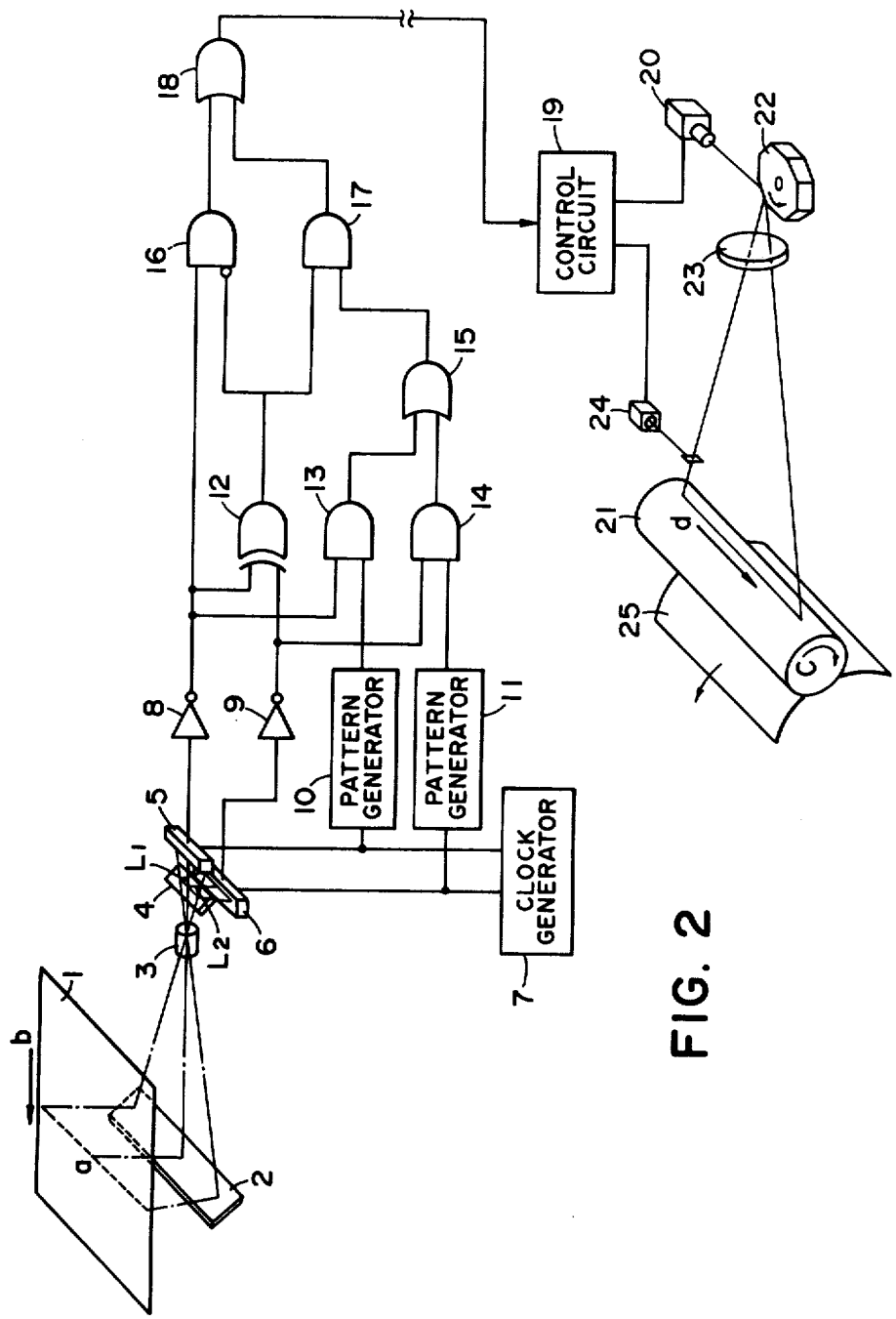
FIG. 2 schematically shows an embodiment of image forming apparatus for carrying out the method of the invention.

FIG. 2 schematically shows an embodiment of apparatus for carrying out the method of the invention.

In FIG. 2, reference numeral 1 designates an original. A first optical path $L_1$ is formed by a mirror 2, lens 3 etc. On the first optical path there is provided an interference mirror 4 which deflects the first optical path to form a second optical path $L_2$. The original 1 is focused on a first solid image sensor 5 and a second solid image sensor 6 through the first and second optical paths $L_1$ and $L_2$ respectively. The sensors 5 and 6 may be, for example, CCD image sensors. The whole surface of the original 1 is scanned by scanning of the image sensors in the primary scanning direction indicated by arrow a and in the secondary scanning direction indicated by arrow b.

If the original 1 contains any component of long wavelength such as portion colored in red, then the component of long wavelength passes through the interference mirror and enters the first image sensor 5 along the first optical path $L_1$. On the contrary, if the original 1 contains any component of short wavelength such as portion colored in blue, then the component of short wavelength is reflected by the interference mirror toward the second image sensor 6 and therefore it enters the image sensor 6 along the second optical path $L_2$. If there is a portion containing both of the component of long wavelength and the component of short wavelength as in the case of the white portion of an original, the two components are separated by the interference mirror so as to direct the former to the image sensor 5 and the latter to the image sensor 6.

For primary scanning of the respective image sensors 5 and 6 a clock signal is generated from a clock generator 7. Original signals photo-electrically transformed by the respective solid image sensors 5 and 6 are then digitized by comparators 8 and 9 and put out from the comparators as inversion signals respectively. Thus, the output signal from each the comparator is "1" when the corresponding image sensor has no determined input and the output signal is "0" when the image sensor has a determined input.

Therefore, at the comparator 8, its output becomes "1" when the original is black or composed of the component of short wavelength and it becomes "0" when the original is white or composed of the component of long wavelength. At the other comparator 9, its output becomes "1" when the original is black or composed of the component of long wavelength and becomes "0" when the original is white or composed of the component of short wavelength.

Designated by 10 and 11 are pattern generators each of which generates a pattern different from the other as a matter of course. 12 is an exclusive "or" (EXOR) gate whose output is "0" when the outputs from the comparators 8 and 9 are both "0" or both "1". In the remaining cases, its output is always "1".

13 and 14 are AND gates. When the comparator 8 has no determined input, the output from the pattern generator 10 is allowed to pass through the AND gate 13. Similarly, when the comparator 9 has no determined input, the output from the pattern generator 11 is allowed to pass through the other AND gate 14. Designated by 15 is an OR gate which generates an output when it receives an output from either AND gate 13 and 14.

16 is an AND gate which issues an output only when the output of comparator 8 is "1" and that of EXOR gate 12 is "0". As previously noted, the former becomes "1" when the original is black or composed of the component of short wavelength. At the time the former can be "0" when the output of comparator 9 is "1". Therefore, AND gate 16 has an output only when the original is black.

17 is an AND gate which allows the output from either pattern generator to pass when EXOR gate's output is "1". The output of EXOR gate becomes "1" when the original is composed of the component of short wavelength only or of the component of long wavelength only. In the case of short wavelength component only, the comparator 8 is "1" and the comparator 9 is "0". Therefore, in this case, the output of the pattern generator 10 is issued from the gate 17. On the contrary, in case that the original is composed of the component of long wavelength only, the output of the other pattern generator 11 is issued from the gate 17.

Consequently, when the original is black, the output signal of comparator is allowed to appear directly at the output of the last gate, OR gate 18. If the original is of short wavelength component (for example, blue) or of long wavelength component (for example, red), then the output signal from pattern generator 10 or 11 respectively is issued from the OR gate 18 as its output.

The original read signal processed in the above manner is then introduced into an image formation control circuit 19 which modulates the laser beam emitted from a laser beam generator 20 in accordance with the introduced signal. Designated by 21 is a recording drum made of photosensitive material or the like in the manner known per se. The recording drum 21 rotates in the direction of arrow c. The modulated laser beam is moved by a polygon mirror 22 rotating at a high speed to scan the drum surface in the direction of arrow d. Since the laser beam passes through a f-$\theta$ lens during the scanning, the scanning speed is kept constant. A beam detector 24 is provided to detect that the laser beam is at the scanning start position.

By the scanning of laser beam there is formed a latent image on the recording drum 21 in the manner known per se. Although not shown in the drawing, latent image forming means, developing means, transferring means, cleaning means etc. are disposed around the recording drum 21. Structure and arrangement of these means are all well known in the art and therefore need not be further described. An image of the original formed on the recording drum is transferred onto a transfer material.

In the image on a transfer material obtained in the above manner, black or grey image portion and white non-image area of the original are reproduced as they were in the original. Colored portions of the original such as a red portion and a blue portion of the original are represented by corresponding patterns determined by the patterns generated from the above pattern generators. These patterns make it possible to clearly distinguish image portions which were colored portions in the original from the image portion which was originally a grey portion in the original at a glance to the reproduction. Furthermore, on the reproduction a person can easily distinguish the originally red portion from the originally blue portion as will be described hereinafter.

Figure 3A:
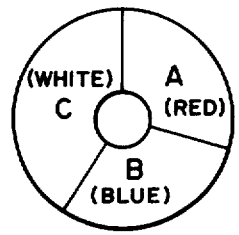
FIG. 3A shows an example of color original.

FIG. 3A shows an example of color original which is a differently colored chart.

Figure 3B:
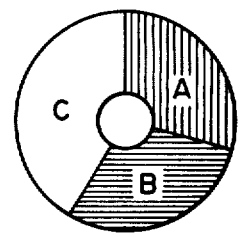
FIG. 3B shows an image formed from the original according to the invention.

Area A of the chart is red, area B is blue and area C is white (blank). Lines are all black. FIG. 3B shows an example of reproduction of the original obtainable according to the above embodiment of the invention. In the reproduction, the red area A of the original is represented by a hatching of lines vertically as viewed in the drawing. The blue area B of the original is represented by another hatching lines horizontally. Blank area C and black lines are all faithfully reproduced as they were in the original.

While in the above embodiment the read signal of an original has been shown and described to be directly introduced into an image formation control circuit for starting writing operation, it is of course possible to use the read signal in different ways. For example, the read signal may be transmitted to a remote destination through a telephone line or it may be introduced into a word processor for further processing such as editting.

FIG. 4 shows a second embodiment of the invention. According to this embodiment, one and single pattern generator common to different color portions is used and therefore a further simplification of the apparatus shown in FIG. 2 can be attained.

In FIG. 4, reference numeral 31 designates an original the long wavelength component of which enters a first solid image sensor 35 along a first optical path $L_1$, through mirror 32, lens 33 and interference mirror 34. The short wavelength component of the original 31 is reflected by the interference mirror 34 toward a second optical path $L_2$, and is projected on a second solid image sensor 36. Primary scanning of the respective image sensors 35 and 36 is controlled by clock signals issued from a clock generator 37.

Original signals photo-electrically transformed by the image sensors 35 and 36 are digitized by comparators 38 and 39 respectively. Then, the signals are put out from the comparators as inversion signals. These steps are entirely the same as in the first embodiment shown in FIG. 2 and described above.

This second embodiment is featured in that the apparatus includes only one pattern generator 40 which is operable in response to different color detection signals coming from the two image sensors.

More specifically, one of two outputs obtainable from the pattern generator 40 is directly applied to one input of and AND gate 42. The other output pattern is inverted by an inverter 41 and then the inverted output is applied to one input of another AND gate 43. Output from the comparator 38 is applied to another input of AND gate 42 whereas output from the comparator 39 is applied to another input of AND gate 43. Since outputs from the pattern generator 40 are always being applied to AND gates 42 and 43 respectively, the gate 42 has an output when the output of the comparator 38 is "1" and also the gate 43 has an output when the output of the comparator 39 is "1". More concretely, when the original is white, the comparators 38 and 39 are both "0" and therefore neither gate 42 nor gate 43 has output. When the original is black, the ouputs from the comparators 38 and 39 are both "1" and therefore both of the gates 42 and 43 can issue an output. At that time, the output pattern directly coming from the pattern generator 40 is put out from the gate 42 whereas the inverted output pattern is put out from the gate 43. These two output patterns enter an OR gate 44. Consequently, a composite signal resulting from the direct output pattern and the inverted output pattern is issued from the OR gate 44. Thus, a reproduction of even a black image can be obtained.

When the original is composed of a long wavelength component such as red, the output of comparator 38 becomes "0" and that of comparator 39 becomes "1" and, therefore, in this case, the inverted pattern is put out from OR gate 44. If the original is composed of short wavelength component such as blue, then the output from comparator 38 is "1" and that of comparator 39 is "0". Therefore, in this case, the direct output pattern from the pattern generator 40 is issued from the OR gate 44.

FIG. 5A shows an example of the pattern generated from the pattern generator described above and FIG. 5B shows also an example of the inverted pattern mentioned above. Various other patterns may be used for the same purpose.

In the above two embodiments, color components of an original have been divided into two components, that is, component of long wavelength side and component of short wavelength side and color detection has been carried out for these two components. However, this invention is never limited to these embodiments only. For example, three color separation may be employed by increasing the number of color separation means and image sensors. In this case, reading of an original is carried out on three wavelength regions, namely, red (R), green (G) and blue (B) and different patterns are used for different regions.

As understood from the foregoing, the present invention has a great advantage over the prior art. Even when an original contains two or more colored portions in different colors having nearly equal density to each other, the present invention produces such reproduction of the original in which these colored portions are distinguishable from each other and also from ordinary grey image portions. Since original data are distinguishable one from another according to color, it is easy to keep high accuracy in data transmission or data edition.

While the invention has been particularly shown and described with reference to preferred embodiments thereof, it will be understood by those skilled in the art that the foregoing and other changes in form and details can be made therein without departing from the spirit and scope of the invention.

What I claim is:

1. A method of forming images comprising the steps of:
   reading an original to generate a read signal;
   discriminating between the presence and absence of a portion having a predetermined color in the original;
   in accordance with said discriminating step, replacing the read signal for the portion of the original having predetermined color with a predetermined pattern signal; and
   forming an image of the original in accordance with the read signal and the predetermined pattern signal.

2. A method of forming images comprising the steps of:
   reading an original to generate a read signal;
   discriminating between the presence and absence of portions having predetermined colors in the original;
   in accordance with said discriminating step, replacing the read signal for said portions of the original having predetermined colors with respective and different predetermined pattern signals; and
   forming an image of the original in accordance with the read signal and the predetermined pattern signals.

3. A method according to claim 2, wherein the predetermined pattern signals are respectively generated by pattern generators for different colors.

4. An image forming method according to claim 3 wherein the images formed in accordance with two kinds of predetermined pattern signals generated by different pattern signal generators and corresponding to different predetermined colors are inverted images one with respect to the other.

5. An image forming method according to claim 3 wherein respective predetermined pattern signals corresponding to respective predetermined colors that, when combined together, yield black, produce patterns in said image forming step that, when combined together form an even black image.

6. Apparatus for forming images comprising:
   means for reading an original while discriminating between presence and absence of a colored portion in said original;
   means for generating a predetermined pattern signal; and
   means for putting out the read signal derived from said reading means while replacing the read signal corresponding to the colored portion of a predetermined color with the signal generated from said pattern generating means.

7. Apparatus for forming images comprising:
   a plural number of reading means for reading different color components respectively;

means for generating a plural number of pattern signals;

output means for putting out a read signal as an image forming signal when the outputs of said plural number of reading means are all the same signal; and output means for putting out the predetermined pattern signals generated by said pattern signal generating means as image forming signals when the outputs of said plural number of reading means are different from each other.

8. Apparatus for forming images comprising:

a plural number of reading means for reading different color components respectively;

means for generating a pattern signal;

means for inverting the pattern signal generated by said pattern signal generating means; and output means for putting out a composite signal resulting from the output signal from said pattern signal generating means and the output signal from said inverting means as an image forming signal when the outputs from said plural number of reading means are all the same image read signal.

9. Apparatus as set forth in claim 8, which further comprises means for putting out either one of the output signals coming from said pattern signal generating means and from said inverting means as an image forming output signal when either one of said plural number of reading means puts out a read signal.

* * * * *